July 31, 1934.  F. E. STOVER  1,968,326
EGG TRAY RACK
Filed Jan. 6, 1930  5 Sheets-Sheet 1

INVENTOR
FRANK E. STOVER,
BY
Toulmin & Toulmin
ATTORNEYS

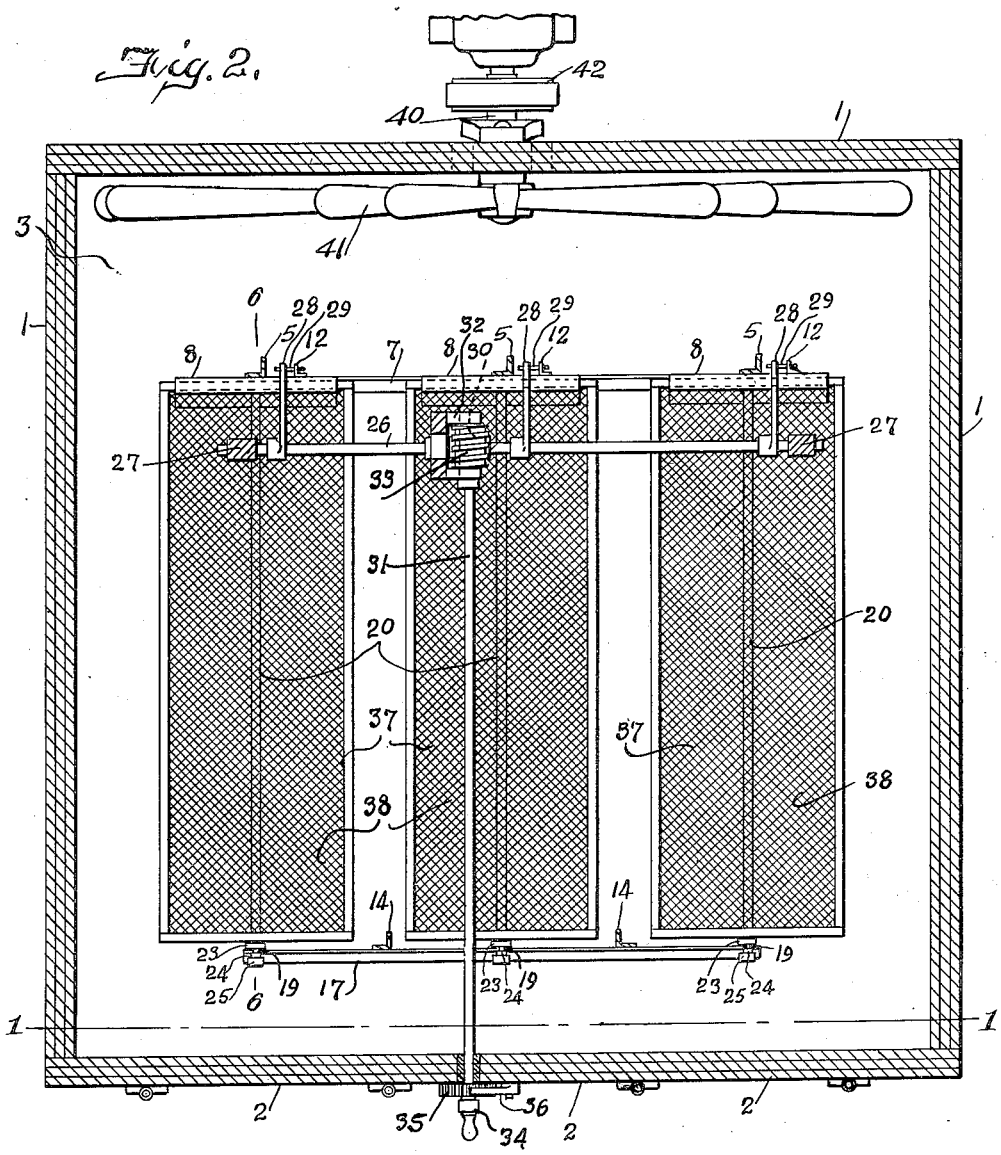

July 31, 1934.     F. E. STOVER     1,968,326
EGG TRAY RACK
Filed Jan. 6, 1930     5 Sheets-Sheet 3
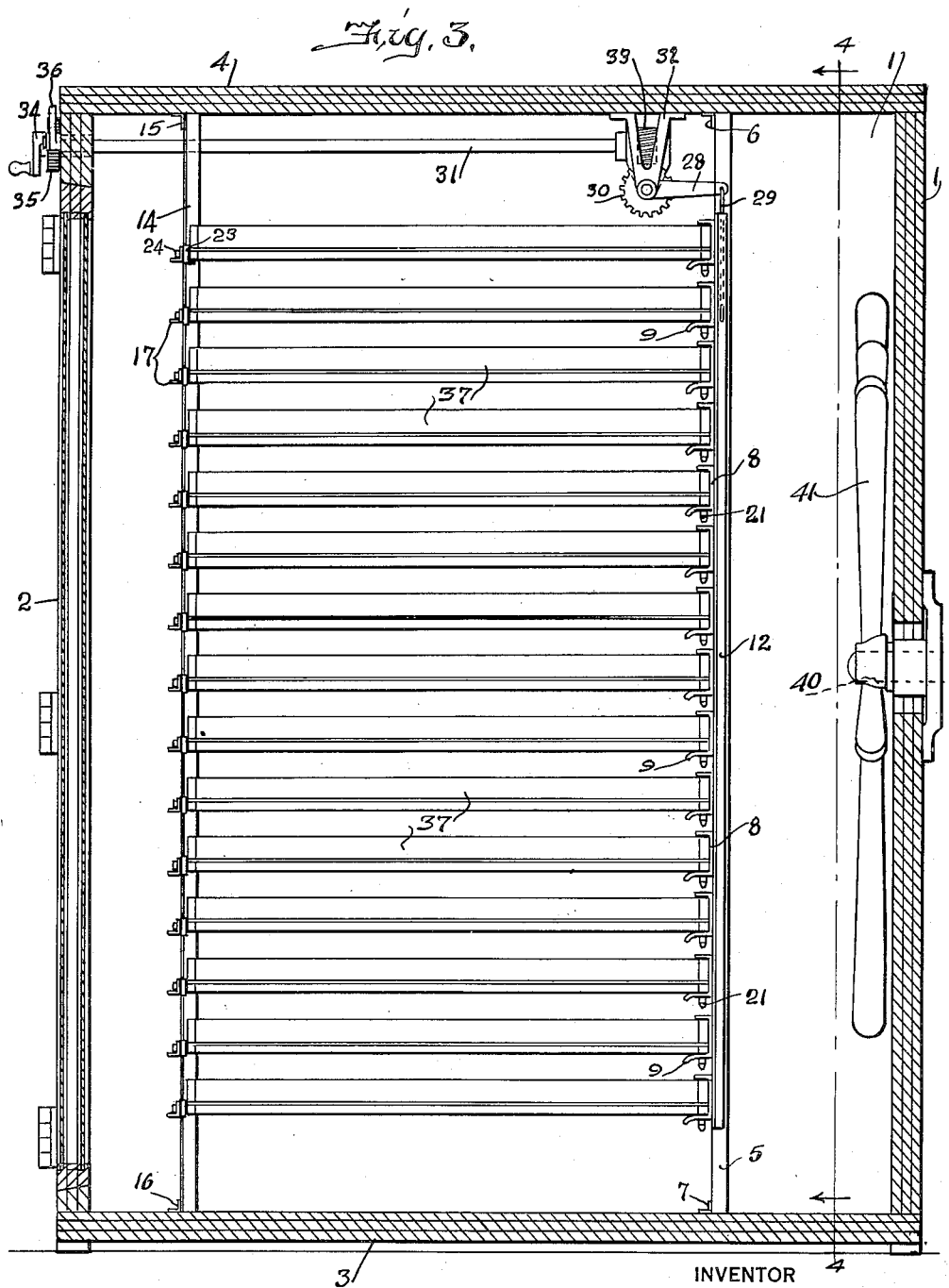
INVENTOR
FRANK E. STOVER,
BY
*Toulmin + Toulmin*
ATTORNEYS

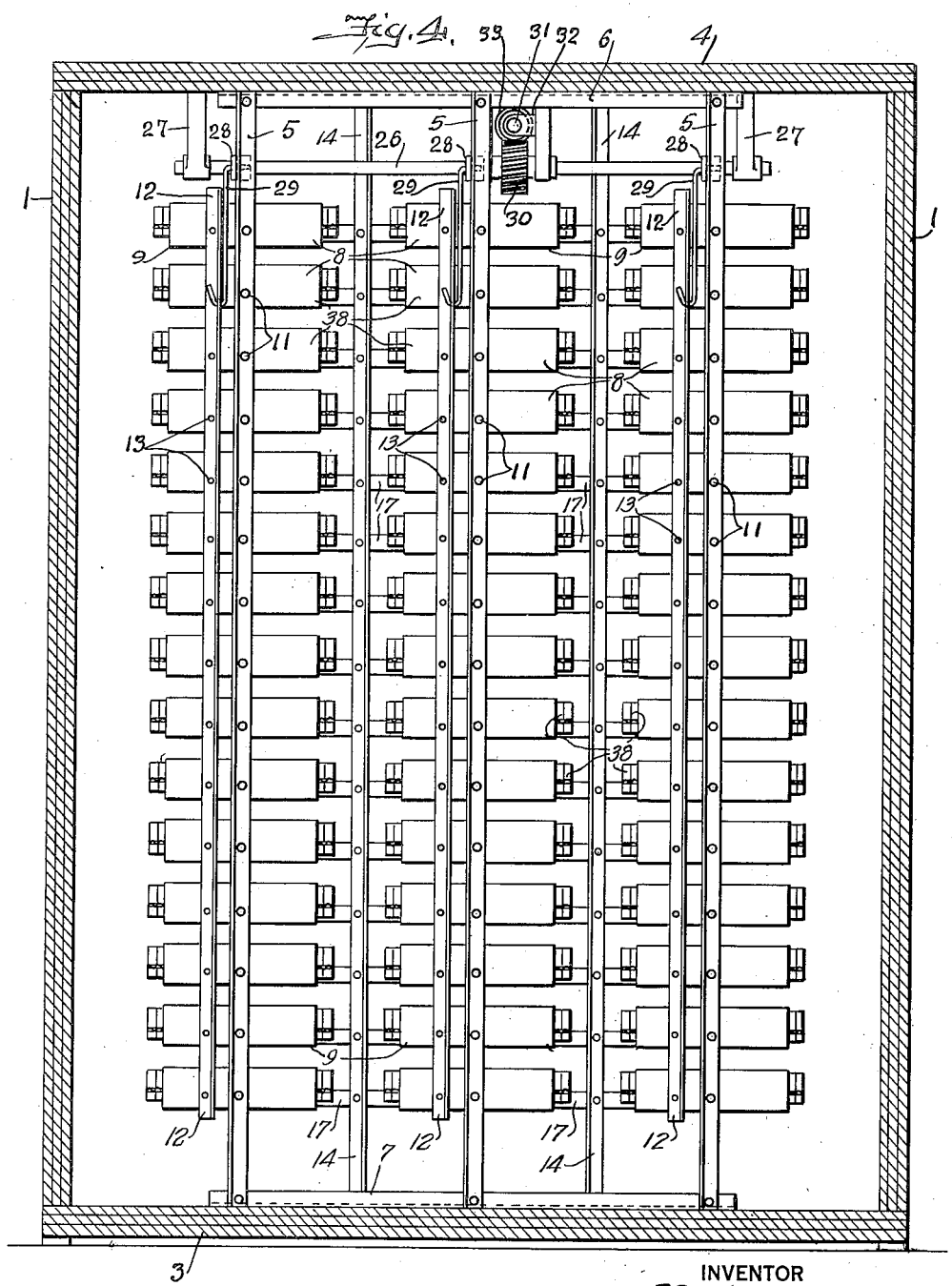

July 31, 1934.  F. E. STOVER  1,968,326
EGG TRAY RACK
Filed Jan. 6, 1930  5 Sheets—Sheet 5
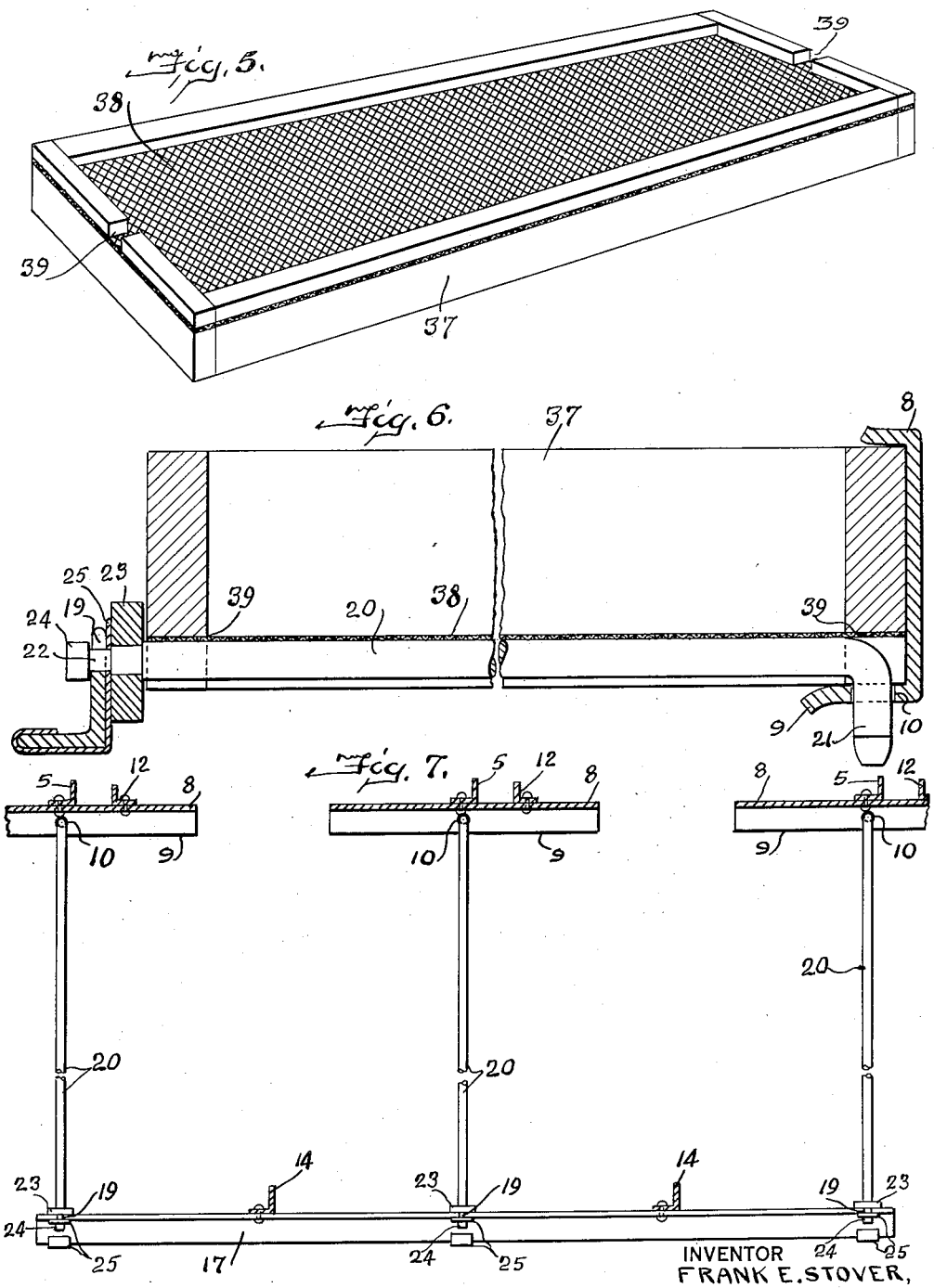
INVENTOR
FRANK E. STOVER,
BY
Toulmin & Toulmin
ATTORNEYS Patented July 31, 1934

1,968,326

UNITED STATES PATENT OFFICE 1,968,326

EGG TRAY RACK

Frank E. Stover, Springfield, Ohio, assignor of one-third to Bruce A. Mayer, and one-third to Dennis T. Igou, both of Springfield, Ohio Application January 6, 1930, Serial No. 418,823

18 Claims. (Cl. 119—44)

This invention relates to improvements in egg tray racks, and has for its object to provide, in connection with a proper housing or casing, means for supporting individual egg trays so that each tray is separately and distinctly held in position and may be removed from its position without interfering with the other egg trays within the housing.

It is also an object of this invention to provide, in connection with a support for egg trays, a plurality of pivotally supported shoes adapted to receive one of the ends of egg trays.

For the purpose of supporting the body and the other ends of these trays horizontal rack bars are provided with connecting rods extending from these rack bars to the shoes. There is also provided means in the housing for properly shifting or tilting the trays during the process of incubation of the eggs. There is also provided means for stirring or agitating the air within the housing or casing so that the air will be equally distributed to all parts of the eggs within the casing.

Referring to the drawings:

Figure 2 is a horizontal section taken on the line 2—2 of Figure 1.

Figure 3 is a vertical section on the line 3—3 of Figure 1.

Figure 4 is a vertical section on the line 4—4 of Figure 3.

Figure 5 is a perspective view of an egg tray.

Figure 6 is a section on the line 6—6 of Figure 2, without showing the back support.

Figure 7 is a section on the line 7—7 of Figure 1.

Figure 1:
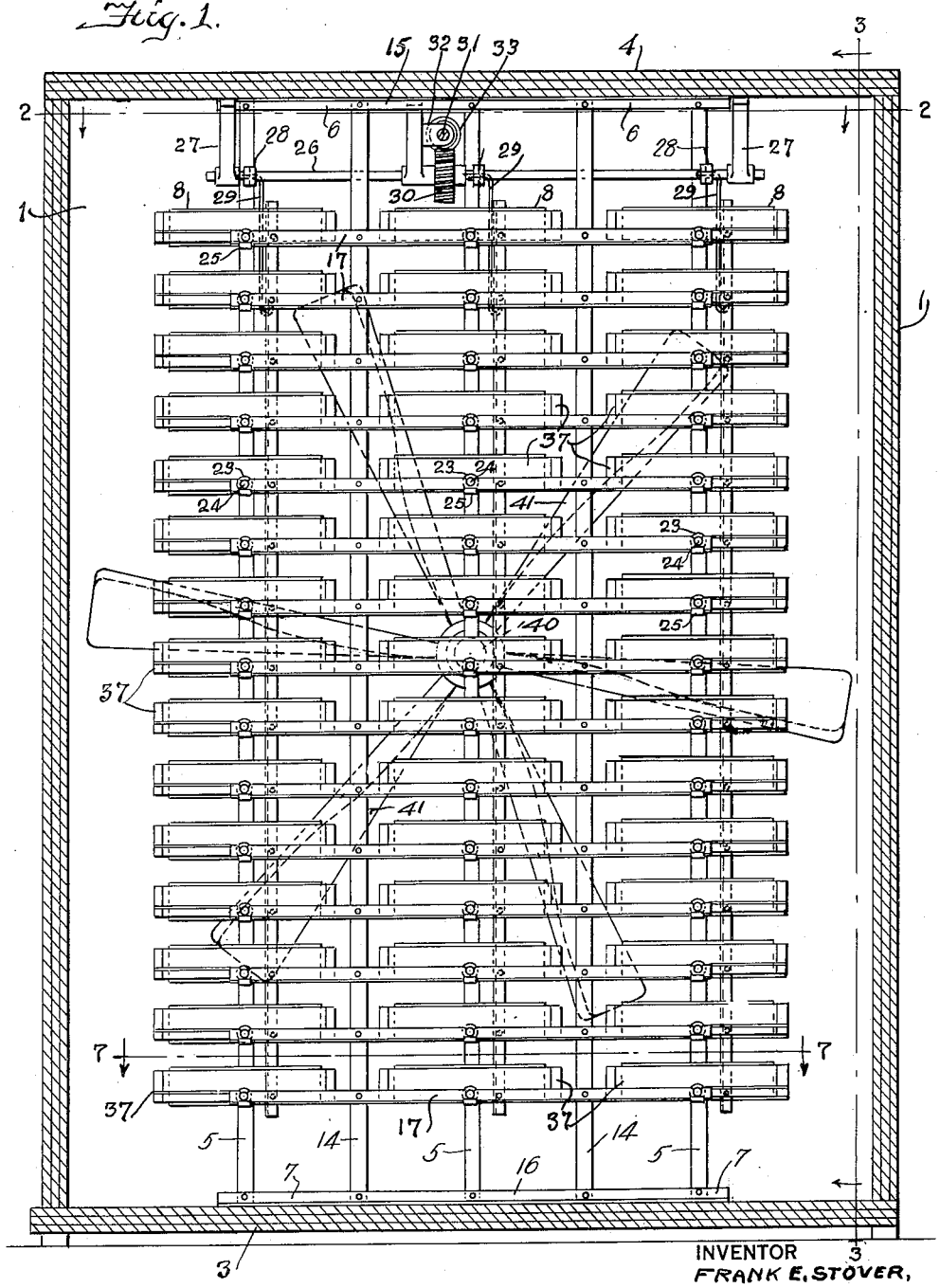
Figure 1 is a vertical section taken on the line 1—1 of Figure 2.

The egg tray rack is inclosed within the usual casing or housing, having side and rear walls indicated by the numeral 1, with the usual door 2 in front. The bottom of the housing is indicated by the numeral 3, while the top is indicated by the numeral 4.

In the rear of the housing there is a plurality of upright posts 5. In the present instance there are three of these posts shown, but any number can be used depending upon the number of tiers of egg trays. One post is usually provided for each tier of egg trays. These posts are supported at the top of the housing by means of angle irons 6, and at the lower ends they are supported on the floor or bottom of the housing by means of angle irons 7. To each upright or rear post is pivotally attached a plurality of tray shoes 8. These tray shoes are channel shaped, with the bottoms thereof attached to the supports or posts. The lower arms 9 of these tray shoes are curved downward to form a receiving cam for the end of the tray and have in the centers thereof adjacent the pivot points 11 of the shoes, holes 10 to receive one of the ends of rods hereinafter to be described.

To each of the tiers of tray shoes is pivoted a tilting bar 12 for the purpose of operating in unison all of the shoes and the egg trays supported thereby for tilting purposes. There is one of these tilting bars for each rear post or support. These bars are pivoted to the tray shoes at points indicated by the numeral 13.

In the front part of the casing or housing there is a plurality of front supports or posts 14 located in front but between the tiers of egg trays. These posts are attached to the top of the housing by means of angle irons 15 and to the floor of the housing by means of angle irons 16. These front supports are for the purpose of supporting the front ends of the egg trays, and for that purpose are provided with front tray bracket bars 17 suitably attached to the front posts or supports. There is one of these rack bars provided for each tray in each tier of trays. These rack bars are provided on the upper edges thereof with notches 19 to receive and support one of the ends of tray rods 20. The manner of supporting the tray by means of the tray rods is illustrated in Figure 6. The inner end of each tray rod is bent down at 21 and engages the hole 10 in one of the tray shoes. The other or front end of the tray rod is formed with a neck 22 thereon which engages one of the notches 19 so that the rod is supported for egg tray supporting purposes.

Between the bracket arm which supports the egg tray as shown in Figure 6, and the front end of the egg tray is a washer 23. On the outer end of the tray rod, as shown in this figure, is a head 24 that holds the rod against longitudinal movement in the notch 19. For the purpose of holding the tray rod against upward movement there is provided a rod lock 25 which is composed of a piece of soft metal, somewhat rectangular in shape, with a hole in one end to fit over the head 24 and engage the neck between the washer 23 and the bracket bar 17 supporting this end of the rod.

When the rod lock is first applied it is a straight rectangular sheet of metal, but after applied it is bent forward under the lower part of the bracket bar and then bent upward and backward over the front part of this bar so that it cannot be removed therefrom without reversing the operations here described. The rod lock thus formed and located tends to hold the front end of the tray rod seated within the notch 19 so that it cannot be removed accidentally therefrom.

While I have here described only one rod and its means of attachment and support the same description applies to each of the rods for each tray supported by the whole tray supporting structure.

Extending across the upper part of the housing is a shaft 26 supported by suitable brackets 27 attached to the top of the housing and extending downwardly therefrom. This shaft is adapted to rotate in proper bearings in the lower ends of the brackets 27. Extending from the shaft 26 are arms 28, one for each tier of trays supported within the housing. While there are shown three of these arms corresponding to the number of tiers or trays, any number may be used, depending upon the size of the housing and the number of tiers of trays supported therein.

Extending from the outer ends of the arms 28 are links 29 attached at one end to the arms and at the other end to the tilting bars 12 for the purpose of tilting the egg trays by the rotation of the shaft 26. On the shaft 26 is a worm gear 30. Located within the housing and extending substantially at right angles to the shaft 26 is a crankshaft 31 supported at one end on a bracket 32 extending from one of the brackets 27. This crankshaft is rotatably supported in the outer end of the bracket, and has on one end thereof a worm 33 meshing with the worm gear 30. On the other end of this crankshaft is a crank and handle 34 for the purpose of rotating the crankshaft and through it rotating the shaft 26 and tilting the egg trays.

Adjacent the crank and handle 34 and between the handle and the front wall of the housing is a ratchet wheel 35 on the shaft 31, which cooperates with the pawl 36 attached to the front wall of the housing to prevent the crankshaft from rotating except when operated by the crank and handle. The egg trays supported by the tray shoes and the tray rods are indicated by the numeral 37. One of these trays is shown in an enlarged view in Figure 5. It is composed of a rectangular frame with a screen bottom 38 therein. The lower edge of each bottom is notched at 39 to engage and receive a rod 20. The tray supported by the rod is shown in Figure 6, but the tray here shown is in section. This figure shows the back end of the tray fitted within the tray shoe and supported by the tray shoe and the rod, and the bracket bar supporting the front end of the rod.

In the rear of the casing or housing is rotatably mounted a fan shaft 40 which has on the inner end thereof a fan composed of blades 41. These blades are twisted slightly to cause the air to move away from the fan and the back wall of the housing toward the trays located in front thereof. For the purpose of rotating the fan there is provided on the fan shaft without the casing a pulley 42. This pulley is suitably connected to any source of power. However, the pulley may be displaced and the fan shaft connected directly to the motor shaft for the purpose of rotating the fan directly from the motor instead of indirectly by means of the pulley 42.

In the figures shown the trays are in a horizontal position, but they may be shifted from this horizontal position to a slightly tilted position in either direction by the rotation of the shaft 26, which is rotated by the shaft 31 by operating the crank and handle 24. When the trays are tilted into the position desired they are locked in that position by means of the pawl and ratchet structure on the front of the housing, as shown in Figure 3.

By means of the structure here each tray is individually and separately supported, and supported in such a manner that it may be readily tilted without danger of becoming displaced, and may be easily removed therefrom when desired. To remove the tray it is only necessary to bend the rod lock so that it can be removed from the bracket arm. After this the front end of the rod 20 is raised so that the tray may be removed from the bar and from the tray shoe which supports the rear end thereof. The tray may be as easily placed in position as it is removed therefrom. The washer 23 is merely a spacer to hold the tray slightly spaced from the bracket bar and may be readily removed from the rod 20 when it is raised at its front end. When this is done the tray may be slipped forward, released from the shoe and entirely withdrawn from the housing.

I desire to comprehend within my invention such modifications as may be clearly embraced within my claims and the scope of my invention.

Having thus fully described my invention, what I claim is new and desire to secure by Letters Patent, is:

1. In an incubator, in an egg tray rack, a post, a plurality of channel-shaped tray shoes pivotally mounted on and supported by said post, each shoe having horizontally disposed arms, and means for rocking said shoes, the lower arm of each shoe being curved downwardly.

2. In an incubator, in a tray rack therefor, a plurality of posts, a plurality of channel-shaped tray shoes pivotally mounted on and supported by each post, each shoe having horizontally disposed arms and means connecting the tray shoes of all the posts for tilting them, the lower arm of each shoe being curved downwardly.

3. In an incubator, in a tray rack therefor, a plurality of posts, a plurality of channel-shaped tray shoes pivoted to and supported by each post, each shoe having horizontally disposed arms, each shoe having a lower downwardly curved arm, a tilting bar pivoted to the tray shoes of each post to hold the shoes in parallel relation to each other and to tilt the shoes on the post, and common means for moving all of the tilting bars.

4. In an incubator, in a tray rack therefor, a plurality of back supports, a plurality of channel-shaped tray shoes pivoted to each support, each shoe having a lower downwardly curved arm, a plurality of front supports, a plurality of horizontally arranged bracket bars on the front supports, a tray supporting rod for each shoe supported at one end by the lower arm of the tray shoe and at the other end by a bracket bar, and means for simultaneously tilting all of the shoes.

5. In an incubator, in a tray rack therefor, a plurality of back supports, a plurality of tray shoes pivoted to each back support, a plurality of front supports, a plurality of horizontally arranged bracket bars on the front supports, one for each tray shoe on any back support, and a tray supporting rod for each tray shoe supported at one end by a tray shoe adjacent its pivot and at the other end by a bracket bar so that said rods are supported horizontally and in spaced parallel relation to each other.

6. In an incubator, in a tray rack therefor, a plurality of back supports, a plurality of channel shaped tray shoes pivoted to each back support, a plurality of front supports having thereon a horizontally arranged bracket bar for each tray shoe on any back support, and a tray rod for each tray shoe adapted to support an egg tray and hold one end of said tray in said tray shoe, said tray rod being supported at one end by a tray shoe and at the other end by a bracket bar.

7. In an incubator, in a tray rack therefor, an upright support, and a plurality of pivotally connected channel shaped tray shoes pivoted to and supported by the support, each shoe having a lower downwardly curved arm.

8. In an incubator, in a tray rack therefor, a plurality of upright supports, a plurality of channel shaped tray shoes pivoted on the supports, each shoe having spaced horizontally extending arms adapted to support one end of an egg tray, each shoe having a lower downwardly curved arm, means to support the other ends of said trays and means to simultaneously tilt the trays.

9. In an incubator, in a tray rack therefor, a plurality of supports, a plurality of channel shaped tray shoes pivoted to the supports, each shoe having spaced horizontally extending arms adapted to support one end of an egg tray, each shoe having a lower downwardly curved arm, a tray rod for each tray shoe supported at one end by the curved arm of said tray shoe, means for supporting the other ends of said rods and cooperating with the rods and shoes for supporting egg trays, and means to simultaneously tilt the trays.

10. In an incubator, in a tray rack therefor, supports, a plurality of tray shoes pivotally supported on the supports, each having a downwardly curved arm formed to receive and support one end of an egg tray, means partly supported by said shoes to support the other ends of said trays, and means to rock said shoes to tilt the trays partially supported thereby.

11. In an incubator, in a tray rack therefor, supports, a plurality of tray shoes pivotally supported on the supports each shoe formed to receive and support one end of an egg tray, a plurality of parallel bracket bars and supports therefor, and a plurality of tray rods, each rod supported at one end by a tray shoe and at the other end by bracket bar so that each tray shoe and one of the tray rods support an egg tray.

12. In an incubator, in a tray rack therefor, supports, a plurality of tray shoes pivotally supported on the supports, each shoe formed to receive and support one end of an egg tray, each shoe having a hole therein, a plurality of parallel bracket bars and supports therefor, each bar having notches therein, and a plurality of tray rods, each rod at one end fitting in the hole in one of said tray shoes and having its other end in one of the notches of one of said bars.

13. In an incubator, in a tray rack therefor, a support, a plurality of channel shaped tray shoes pivotally supported on the support, each shoe shaped to receive and support one of the ends of one of a plurality of egg trays, each tray shoe having a tray supporting rod loosely and removably attached thereto and extending horizontally therefrom, means to support the other ends of said rods, and means engaging said tray shoes to tilt them and the egg trays supported by them and the rods.

14. In an incubator, in a tray rack therefor, a plurality of tiers of pivotally supported channel shaped tray shoes, each tray shoe having horizontally disposed arms to receive and support one of the ends of one of a plurality of egg trays, each tray shoe having a tray supporting rod removably attached thereto and extending horizontally therefrom, means to support the other ends of said rods, means pivotally connecting the tray shoes of each tier, and means connected to each of the last named means for tilting all the tray shoes and the egg trays supported by the tray shoes and the rods.

15. In an incubator, in a tray frame therefor, a support, a plurality of pivotally connected channel shaped tray shoes pivotally supported on said support, a tray rod extending horizontally from each tray shoe, an egg tray supported on one of said rods with one end in said channel part of one of said shoes, the bottom edges of the ends of said tray being notched to form a seat for said rod, and means to support the ends of the rods remote from the shoes.

16. In an incubator, in combination with a pivotally supported tray rod with a tray shoe on one end, means to support the tray shoe and the other end of the rod, and an egg tray having a frame composed of side walls and end walls, said end walls being notched on their lower edges to receive said tray rod, whereby the tray may be supported on said rod with one end in said tray shoe.

17. In combination, a support, a shoe having horizontally disposed arms pivoted on said support, means for actuating said shoe on its pivot, a rod removably supported at one end by the lower arm of said shoe, means for pivotally supporting the other end of said rod, and a tray mounted on said rod with one end in the shoe for pivotal movement therewith.

18. In combination, a support, a shoe pivoted on said support, means for actuating said shoe on its pivot, a rod supported by said shoe, means for pivotally supporting the other end of said rod, and a tray mounted in said shoe and on said rod for pivotal movement therewith, said tray having a slot for receiving said rod to prevent lateral movement of the tray with respect to the shoe and the support.

FRANK E. STOVER.